H. N. WAYNE.
INNER TUBE FOR PNEUMATIC TIRES.
APPLICATION FILED APR. 15, 1918.
1,297,279.
Patented Mar. 11, 1919.
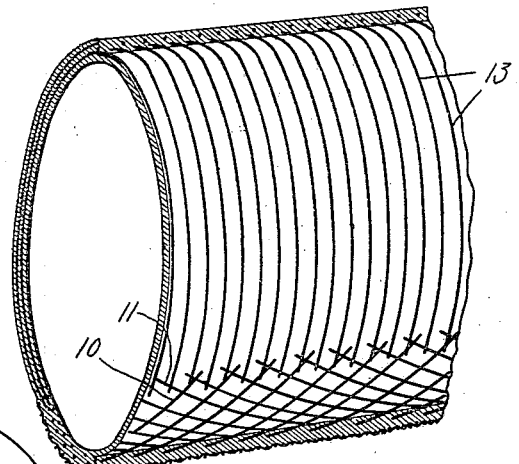
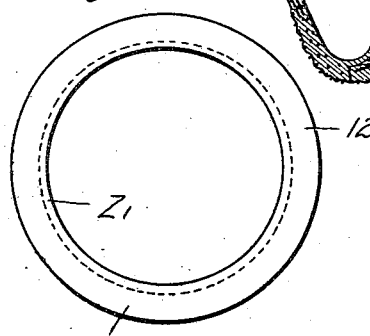
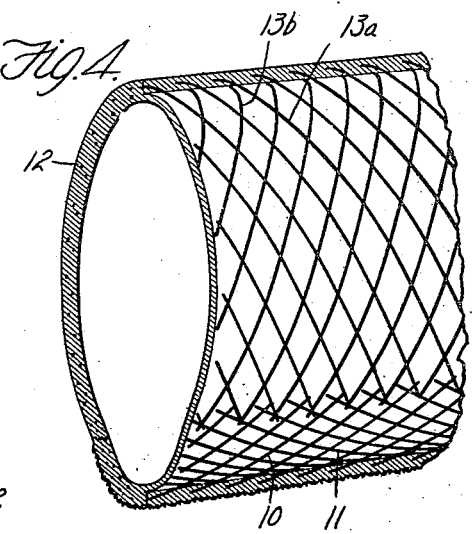
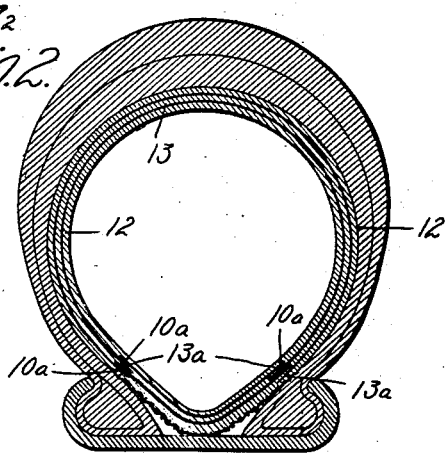
Inventor
Herbert N. Wayne
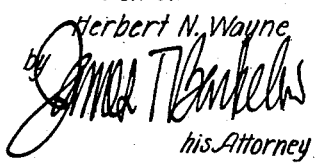
his Attorney

UNITED STATES PATENT OFFICE.

HERBERT N. WAYNE, OF LOS ANGELES, CALIFORNIA, ASSIGNOR TO ARMORCORD TIRE & RUBBER CO., A CORPORATION OF DELAWARE.

INNER TUBE FOR PNEUMATIC TIRES.

1,297,279.

Specification of Letters Patent.  Patented Mar. 11, 1919.

Application filed April 15, 1918. Serial No. 228,692.

*To all whom it may concern:*

Be it known that I, HERBERT N. WAYNE, a citizen of the United States, residing at Los Angeles, in the county of Los Angeles, State of California, have invented new and useful Improvements in Inner Tubes for Pneumatic Tires, of which the following is a specification.

This invention relates to inner tubes to carry air pressure inside pneumatic tires; and the general object of this invention is the provision of an improved reinforced inner tube strong enough in itself to resist rupture by internal pressure should the outer casing of the tire be ruptured; and it is a further object to provide certain particular improvements in such a kind of inner tube, providing strength for the inner tube and at the same time allowing for proper expansibility of the inner tube to completely fill the outer casing. It is also an object to provide an inner tube construction in which transverse or lateral expansion of the tube when within the casing will cause linear circumferential adjustment and contraction of the tube around the rim upon which it is mounted.

The invention, its features, and the manner in which it accomplishes its objects, will be best understood from the following description reference being had for this purpose to the accompanying drawings:—

Figure 1, is a perspective view of a section of inner tube constructed in accordance with the invention and showing one form thereof, the outer layer of rubber being removed for purposes of disclosing the reinforcement;

Fig. 2, is a cross section of the improved tube in place in an outer casing;

Fig. 3, is a reduced elevation of the tube;

Fig. 4, is a perspective view of the tube and showing the preferred form of the invention, the same being shown with the outer layer of rubber removed.

In the drawings, I illustrate a tube construction whose primary feature is a series of diagonally arranged crossed cords 10 and 11, laid in the rubber 12, which forms the body of the tube, so as to be separated from contact with each other by a body of rubber, and which provides a longitudinally extending zone, preferably in the rim or inner portion, designated as zone $Z^1$, in which the cords are laid to form acute angles lengthwise of the tube and thus give to the cords a general, lengthwise direction, though diagonal of the tube. The purpose of this arrangement of the cords is to allow in this zone the freest lateral expansibility and a consequent adjustable contractibility lengthwise of the tube when confined and inflated within the tire casing. The remaining portion of the tube, designated $Z^2$, provides a zone suitably reinforced against blowouts, while providing efficient resiliency around the tread portion and the side walls, by the employment of transversely arranged cords 13, as shown in Fig. 1, but preferably by the diagonal arrangement of cords $13^a$ and $13^b$, as shown in Fig. 4, which illustrates the preferred form of the invention. When the cords are arranged as in Fig. 1, the lateral expansibility of the tube in zone $Z^2$ is restricted, and the expansibility unrestricted lengthwise of the tube unless confined within a casing, in which event further expansibility is arrested on the outer circumference, causing any additional air pressure in the tube to be exerted downward against the portion represented by the zone $Z^1$, and when the internal air pressure is thus exerted on the portion $Z^1$, the tendency is to cause lateral expansion in said zone with consequent longitudinal contraction throughout that zone. When the cords are arranged as in the preferred form shown in Fig. 4, the diagonally crossed cords in zone $Z^2$, provide for lateral expansibility the same as in zone $Z^1$, but in a less degree, and although the expansibility of these crossed cords in said zone $Z^2$, is limited by the outer casing in the same manner as the straight, transversely arranged cords described in reference to Fig. 1, they provide for greater elasticity in all directions and a freer adaptability to the distortions of the tire casing caused by its contact with the inequalities of the surface of the road bed.

By arranging the cords in zone $Z^2$, to form obtuse angles lengthwise of the tube, less proportionate lateral expansibility is provided than in zone $Z^1$, while any requisite expansibility and contractibility is provided lengthwise of the tube as the same may be called into action for its adjustment within the tire casing when the tube is inflated therein, or when yielding to the inequalities of the road surface.

The cords 13, in Fig. 1, or the cords 13ª and 13ᵇ in Fig. 4, may or may not be connected with the cords 10 and 11; but preferably the ends of the cords 13 or 13ª and 13ᵇ merely overlap or pass the ends of cords 10 and 11, thereby providing an intermediate longitudinal zone on each side of the tube, having a greater degree of reinforcement at the points where it is most needed, and also providing an area of restricted elasticity in which the cord loops are anchored.

From the foregoing it will be seen that an effectively reinforced inner tube is provided which by reason of the fact that the reinforcing cords are in the form of loops that only partly surround the tube, and being in two series, for each zone with the cords crossing in their respective zones, the desired reinforcement is present without loss of resiliency, and that by virtue of the angle at which the cords cross each other in each zone a differential of lateral expansion is provided, so that the resistance of the cords in the outer, or zone $Z^2$, which allow a limited expansion laterally owing to their diagonal arrangement, will be supplemented with a coöperative and similar lateral expansion taking place in zone $Z^1$ but with much freer action owing to the arrangement of the cords therein. Also it will be seen that incidental to the transverse expansion there is provided a constricting adjustment longitudinally, the degree of which in each zone depends upon the angle at which the cords of each zone cross each other, and that this constricting adjustment therefore may be of either a temporary or permanent character in the outer zone under the action of the tube in being inflated, according to the degree of angularity present in the crossing cord and the degree and distribution of the pressure within the incased tube.

There may be two or more series or courses of transverse cords 13, two only being indicated in the drawing. Furthermore, I may place a layer of some suitable fabric as stockinet, on the inner circumference of the tube at 15, more or less commensurate with the extent of the diagonal cords. This fabric is arranged so that its direction of expansibility is transverse of the tube and its direction of non-expansibility is longitudinal or circumferential of the tube. This fabric will be exposed, being preferably only partially embedded in the rubber, and will protect and strengthen the rubber of the tube at this point.

I do not, in the broad conception of my invention desire to limit myself to the specific details shown and described, except as specifically stated in the claims as the measure and scope of the claims, but reserve the right to employ all such modifications and variations as may fall within the scope thereof, and these claims are to be interpreted broadly in accordance with the spirit of the invention.

In practice I prefer to apply the cords in the form of the usual cord material used generally in the construction of cord tire casings.

Having described a preferred form of my invention, I claim:

1. A tube comprising an elastic wall and means incorporated with said wall whereby to cause the inner and the outer circumferential parts to have each a different degree of longitudinal contraction of the elastic material of the wall as the tube is inflated within the casing.

2. A tube comprising an elastic wall, and cords arranged diagonally of the length of the tube to cause longitudinal contraction of the tube when the tube expands laterally.

3. A tube comprising an elastic wall, and a plurality of series of crossed cords diagonal to the length of the tube embedded in the elastic wall.

4. An inflatable tire tube having embedded in the walls thereof means normally stretched along lines diagonal of the length of the tube, partly surrounding the tube, and rendered inelastic in said diagonal direction, whereby to permit expansibility of the tube in a lateral direction and a consequent constricting action lengthwise thereof, as and for the purpose set forth.

5. An annular tube comprising an elastic wall, a plurality of series of crossed cords diagonal to the length of the tube incorporated with the inner circumferential part of the tube wall, and cords incorporated with the outer circumferential part of the tube wall.

6. A tube comprising an elastic wall, a plurality of series of crossed cords incorporated with the inner circumferential part of the tube wall, said cords being laid diagonally of the tube and in a general longitudinal direction thereof, and a plurality of series of crossed cords incorporated with the outer part of the tube wall, said cords being laid diagonally of the tube and in a general transverse direction thereof.

7. An annular tube comprising an elastic wall, means incorporated with the inner portion of the wall adapted to provide lateral expansion with consequent longitudinal contracting adjustment and reinforcing means incorporated with the outer circumferential portion of said wall adapted to provide lesser expansibility in the outer circumferential part than in the inner circumferential part.

8. A tube comprising an elastic wall, means incorporated in the outer circumferential part of said wall, and means incorporated in the inner circumferential part of said wall, whereby to cause transverse expansibility in each with a lesser degree of expansibility in the outer circumferential part than in the inner circumferential part when the tube is inflated.

9. A tube having an elastic wall with series of crossed cords embedded in the outer circumferential section of said wall and series of crossed cords embedded in the inner circumferential section of said wall, the cords in the inner circumferential section being laid at an angle different to the cords in the outer circumferential section thereby varying the degree of expansibility of the two sections.

10. An annular tube comprising an elastic wall, a plurality of series of crossed cords diagonal to the length of the tube incorporated with the inner circumferential part of the tube wall, and cords incorporated with the outer circumferential part of the tube wall; the two series of cords overlapping each other at the edges of the inner and outer circumferential parts of the tube, so that the tube is there reinforced by both series of cords.

11. A tube comprising an elastic wall, a plurality of series of cross cords incorporated with the inner circumferential part of the tube wall, said cords being laid diagonally of the tube in a general longitudinal direction, and a plurality of series of cross cords incorporated with the outer circumferential part of the tube wall, said cords being diagonally of the tube in a general transverse direction thereof, the two series of cords overlapping each other at the edges of the inner and outer circumferential parts of the tube, so that the tube is there reinforced by both series of cords.

12. A tube comprising an elastic wall, series of crossed cords incorporated in the outer circumference of said wall and series of crossed cords incorporated in the inner circumferential part of said wall, the series of cords in the outer circumferential part being laid at a different angle to the cords in the inner circumferential part.

13. A tube comprising an elastic wall, series of crossed cords incorporated in the outer circumferential part of said wall and series of crossed cords incorporated in the inner circumferential part of said wall, the cords in the outer circumferential part being laid at a different angle to the cords in the inner circumferential part, to cause a lesser degree of lateral expansibility in the outer circumferential part than in the inner circumferential part when the tube is inflated.

14. An annular tube comprising an elastic wall and means incorporated with an outer circumferential part of said wall to cause longitudinal contraction of the outer circumferential part of the tube when the tube expands laterally, said means embodying a plurality of series of crossed cords embedded in the wall diagonal to the length of the tube.

15. An annular tube comprising an elastic wall, series of crossed cords incorporated in the inner circumferential portion of the tube wall, said cords being laid in a general longitudinal direction of the tube at an angle to cause greater contraction around the inner circumference than around the outer circumference of the tube when the tube is inflated and expanded laterally, and series of crossed cords incorporated with the outer circumferential part of the tube wall, said cords being laid in a general transverse direction of the tube at an angle to cause lesser contraction around the outer circumference than around the inner circumference of the tube when the tube is inflated and expanded laterally.

In witness that I claim the foregoing I have hereunto subscribed my name this 5th day of April, 1918.

HERBERT N. WAYNE.

Witness:
VIRGINIA I. BERINGER.